United States Patent
Kupst et al.

(10) Patent No.: US 7,412,515 B2
(45) Date of Patent: Aug. 12, 2008

(54) METHOD AND APPARATUS FOR DYNAMIC ASSIGNMENT OF NETWORK PROTOCOL ADDRESSES

(75) Inventors: Shirley D. Kupst, Endicott, NY (US); Mark H. Olson, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 633 days.

(21) Appl. No.: 10/255,973

(22) Filed: Sep. 26, 2002

(65) Prior Publication Data

US 2004/0064559 A1    Apr. 1, 2004

(51) Int. Cl.
*G06F 15/173* (2006.01)
*G06F 15/177* (2006.01)
*G06F 15/16* (2006.01)

(52) U.S. Cl. .................. 709/226; 709/220; 709/245

(58) Field of Classification Search ................. 709/245, 709/220, 221, 222; 370/393
See application file for complete search history.

(56) References Cited

U.S. PATENT DOCUMENTS

| | | | |
|---|---|---|---|
| 6,101,499 A | 8/2000 | Ford et al. | |
| 6,151,326 A | 11/2000 | McGuire et al. | |
| 6,243,379 B1 | 6/2001 | Veerina et al. | |
| 6,360,276 B1 | 3/2002 | Scott | |
| 6,675,243 B1 * | 1/2004 | Bastiani et al. | 710/105 |
| 6,697,360 B1 * | 2/2004 | Gai et al. | 370/389 |
| 6,822,957 B1 * | 11/2004 | Schuster et al. | 370/389 |
| 6,950,877 B2 * | 9/2005 | Asano et al. | 709/238 |
| 6,954,459 B1 * | 10/2005 | Vaidhyanathan et al. | 370/392 |
| 7,002,961 B1 * | 2/2006 | Lane et al. | 370/395.1 |
| 7,075,918 B1 * | 7/2006 | Kung et al. | 370/352 |
| 7,180,889 B1 * | 2/2007 | Kung et al. | 370/352 |
| 2002/0024946 A1 | 2/2002 | Jeong et al. | |
| 2002/0042832 A1 * | 4/2002 | Fallentine et al. | 709/230 |
| 2002/0131446 A1 * | 9/2002 | Metcalf, III | 370/465 |
| 2003/0133450 A1 * | 7/2003 | Baum | 370/389 |
| 2004/0143654 A1 * | 7/2004 | Poirot et al. | 709/223 |

* cited by examiner

*Primary Examiner*—John B. Walsh
(74) *Attorney, Agent, or Firm*—Wolf, Greenfield & Sacks, P.C.

(57) ABSTRACT

In a network including at least one switch having a plurality of ports, methods of dynamically assigning network protocol addresses to nodes connected to the network based on the location of the node on the network. The method may include designating a portion of the network protocol address to indicate the port at which a node is connected to a switch on the network.

28 Claims, 5 Drawing Sheets

METHOD AND APPARATUS FOR DYNAMIC ASSIGNMENT OF NETWORK PROTOCOL ADDRESSES

FIELD OF THE INVENTION this invention relates to the field of networks and, more particularly, to assigning network protocol addresses to nodes or devices connected to a network.

BACKGROUND OF THE INVENTION

In networking environments, each node on a network typically has a unique network protocol address to ensure that data transfers and communication between nodes over the network are correctly delivered to the intended destination(s). For instance, the Internet Protocol Version 4 (IPv4) defines a 32-bit address to identify the various nodes on a network. The address is logically subdivided into four octets. The Internet Protocol Version 6 (IPv6) defines a 128-bit address, etc. Each particular network protocol may define a different format for its network protocol address, but in general, the function of the network protocol address is to uniquely identify a node on a network.

The term node refers to any processing location on a network. In general, the terms node, host, and network device will be used interchangeably to describe a network processing location identified by a network protocol address. Exemplary nodes include, but are not limited to, personal computers, printers, fax machines, scanners, network databases, etc.

When a node is connected to a network, a network protocol address may be obtained for the node in several ways. An operator, such as a network administrator, may assign a network protocol address to the node manually. However, manual assignment of network protocol addresses requires both knowledge of the network to insure unique address assignment to each node, and at least the fundamental skills involved in setting up an address for a particular node or device.

Accordingly, manual assignment of network protocol addresses is often time consuming and inconvenient, requiring the availability of an operator with sufficient expertise to bring a device on-line. In addition, manual assignment of network protocol addresses may be vulnerable to operator error, particularly in larger networks or under circumstances where change or update of network protocol addresses is needed.

Another method of obtaining a network protocol address for a node is by implementing a server, connected to the network, and configured to assign network protocol addresses to network nodes as they are connected to the network. According to this approach, the server assumes the responsibilities of the network administrator by assigning network protocol addresses to the nodes on the network either from a pool of available addresses maintained by the server, or by deriving an address from device-specific information or generating addresses algorithmically. A server obviates the need to have an operator manually assign addresses. As a result, the amount of expertise needed to bring a device on-line is reduced since maintenance and book-keeping of available network protocol addresses is managed by the network server.

Several protocols have been developed that define methods by which a network server may communicate with and assign a network protocol address to a node when the node is first connected to the network or the network protocol address of a node needs to be changed or updated. One such protocol is the Dynamic Host Configuration Protocol (DHCP). The DHCP protocol defines a set of messages or packets that permit a node and a server to negotiate a lease on a network protocol address. In a DHCP transaction, the network node seeking a network protocol address is referred to as the DHCP client or simply as the client. A typical transaction between a client and a server is described in the Appendix. In addition, a detailed description of the DHCP protocol is provided in the protocol definition Request for Comment (RFC) 1541, which is hereby incorporated by reference in its entirety.

Server-based assignment approaches supporting DHCP are widely used in current networks. The protocol defines rules by which the client and server communicate, deferring the implementation details of how a server generates and manages network protocol addresses to the server designer. As such, a DHCP server can be customized to suit specific network situations. For instance, many conventional servers allocate a network protocol address from a pool of available addresses. However, in such cases, the address assigned to a particular node is often chosen arbitrarily. As a result, network protocol addresses contain no information associated with the device to which it is assigned.

In other conventional server-based approaches, the network protocol address is generated from information specific to a device. For example, the network protocol address may be hashed or otherwise derived from the physical layer address (e.g., the MAC address, Ethernet address, network interface card (NIC) address, etc.) of the device. These type of algorithmic methods yield addresses that vary as a function of the device (i.e., each device will generate a unique and often deterministic address). At best, such methods produce addresses that can be traced to the hardware address of a device.

However, as will be appreciated by those skilled in the art, device-specific information is typically used as a convenient means to seed an algorithm to insure a network protocol address will be unique, not to embed information about the device in the address. In fact, the original device-specific information may be available from diagnostic information provided by network monitoring software. As such, even in cases where it is recoverable from the hashing function or algorithm, the information is already readily available.

As such, conventional address generation and assignment methods provide network protocol addresses that do not contain useful information about the device to which it is assigned. The address functions only as an identifier to the network. However, from a diagnostic point of view, this information may contain no further information associated with the device.

SUMMARY OF THE INVENTION

Figure 1:
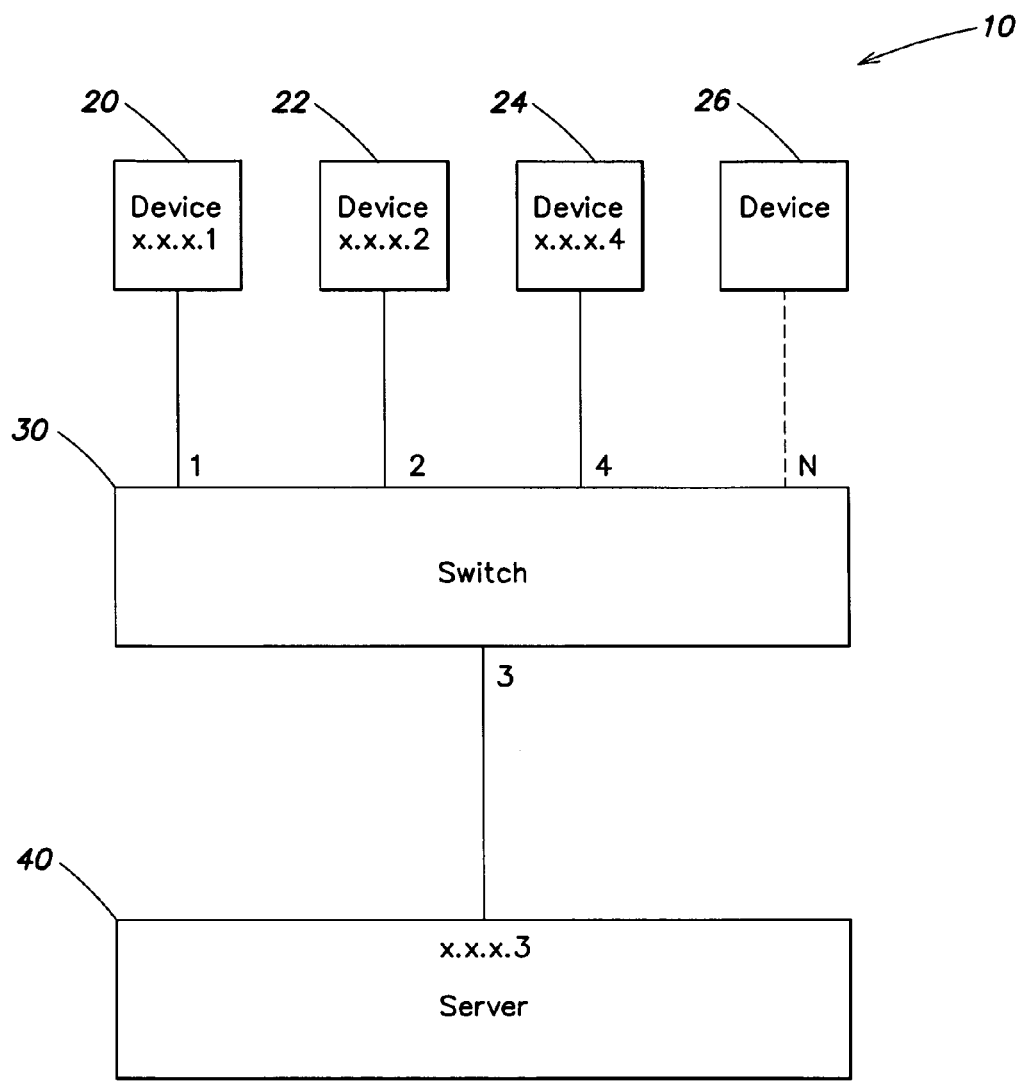
FIG. 1 illustrates a block diagram of a network having a switch, a plurality of nodes, and a server that employs a method of assigning network protocol addresses according to an embodiment of the present invention.

One embodiment according to the present invention includes a method for assigning a network protocol address to a node on a network. The method comprises acts of obtaining location information from the network about a location of the node on the network and determining the network protocol address to be assigned to the node based on the location information.

Another embodiment according to the present invention includes a computer readable medium encoded with a program for execution on at least one processor, the program, when executed on the at least one processor, performing a method of assigning a network protocol address to a node connected to a network. The method comprises acts of obtaining location information about a location of the node on the network, and determining the network protocol address to be assigned to the node based on the location information.

Another embodiment according to the present invention includes a network comprising at least one switch having a plurality of ports, at least one node connected to the plurality of ports of the network switch, and address assignment means adapted to obtain location information about the at least one node from the network and to assign a network protocol address to each of the at least one node based on the location information.

DETAILED DESCRIPTION

Networks are often monitored in order to analyze network activity, identify problems such as bottlenecks, malfunctioning nodes and/or other network errors, facilitate troubleshooting, etc. Often times these tasks are complicated because the association between a network protocol address and a device on the network is not apparent or readily available. This is to say, when a particular network event of interest is detected, for example, a malfunctioning node, the diagnostic information provided by the network may be limited in its ability to facilitate locating the malfunctioning node, for instance, in the building, office, or campus that the network services.

Using conventional network protocol address generation and assignment methods, the physical location of the node cannot be readily obtained from the information made available by the network diagnostics, making it difficult to locate the malfunctioning node and remedy the problem.

As discussed in the foregoing, many conventional network protocol assignment servers arbitrarily assign network protocol addresses depending upon the addresses currently available in the server's address pool, while others may generate addresses algorithmically from device specific information. However, these conventional approaches do not provide information that facilitates locating a device on the network.

Accordingly, Applicant has identified and appreciated the desirability of embedding useful information about a node in the network protocol address assigned to the node, in particular, information that is reducible to the location of the device on the network. As an example, many network monitoring, diagnostic, and trouble-shooting tasks may benefit from an address generation approach where network protocol addresses are generated in order to facilitate identification of the physical location of the network node.

Accordingly, one embodiment according to the present invention includes a method of generating a network protocol address based on location information of the node obtained from the network. The term location information applies generally to information that varies as a function of the location of a device with respect to a network. Typically, the physical location of a device can be readily determined from the location information. For example, location information may include the network port at which a device is connected. This information is independent of the device itself and can be used to readily identify the room, office, or campus location of the device.

Obtaining information "from the network" is used generally to refer to an act of receiving information from any component on or part of the network, including, but not limited to, network switches, bridges, routers, servers, network nodes, etc. Many protocols have been developed in order to facilitate obtaining information about the network from the network. One such protocol is the Simple Network Management Protocol (SNMP). This protocol allows a node or network component to send SNMP messages, called protocol data units (PDUs), to different parts of a network. SNMP-compliant devices, called agents, store data about themselves in Management Information Bases (MIBS) and return this data to the SNMP requesters.

One embodiment according to the present invention includes assigning a network protocol address to a node based on port information about a port of a network switch to which the node is connected. The term port information refers generally to information about a port that identifies it amongst a plurality of ports. In one aspect of the embodiment, a designated portion of the network protocol address may indicate the port number to which the device is attached. Hence, the port number is immediately available from the network protocol address and thus the physical location of the device may be obtained directly from the address assigned to the device.

Following below are more detailed descriptions of various concepts related to, and embodiments of, methods and apparatus according to the present invention. It should be appreciated that various aspects of the invention, as discussed above and outlined further below, may be implemented in any of numerous ways, as the invention is not limited to any particular manner of implementation. Examples of specific implementation are provided for illustrative purposes only.

FIG. 1 illustrates a network 10. The network includes a switch 30 having N network ports, numbered 1, 2, 3, . . . N, where N signifies that switch 30 may include any number of network ports. Connected to the switch are a plurality of nodes, illustrated as network devices 20, 22, 24, and 26. Network devices 20, 22 and 24 are connected to ports 1, 2, and 4, respectively, and have been assigned a network protocol address to uniquely identify the device on the network. Network device 26 has just been connected to the network as denoted by the dotted line and has not yet been assigned a network protocol address.

The network further comprises server 40 connected to switch 30 at network port 3. Server 40 is responsible for assigning a network protocol address to each of the devices when the devices are connected to the network. According to one embodiment of the present invention, the server generates a network protocol address based on location information about a device on the network.

In the embodiment illustrated in FIG. 1, server 40 assigns to each device a network protocol address corresponding to the port number to which it is attached. In particular, server 40 assigns the port number to which the device is attached to a designated portion of the network protocol address. The network protocol addresses illustrated in FIG. 1 are 32-bit addresses divided logically into four octets. However, the illustrated addresses are exemplary and are not limiting. Network protocol addresses of any length and of any logical division are within the scope of the invention.

In the embodiment illustrated in FIG. 1, the final octet of the network protocol address has been assigned the port number to which the device is connected. The x's in the other three octets demonstrate that these numbers can be generated by any means suitable to a particular network implementation. Depending on the protocol, a subset of an address may be required to contain other information.

For example, Internet Protocol (IP) addresses are separated into classes. In IPv4, for instance, the first octet of each of classes A, B, and C holds a number in a range defined for each respective class. In class A addresses, the final three octets are reserved to identify the node or host. In class B addresses, the first two octets are reserved for the network identifier and the final two octets identify the node. In class C addresses, the first three octets are reserved for the network identifier and the final octet identifies the host. As such, the portion of an address designated to store location information may depend on the type of network and the protocol with which the network operates.

When device 26 is connected to the network, server 40 obtains port information about the port to which the device is connected. The port number is determined from the port information and server 40 generates an address based on the port number. As such, server 40 assigns the port number N to the final octet of the network protocol address and issues address x.x.x.N to network device 26.

In the foregoing embodiment, each device on the network has a network protocol address that the network uses to identify and deliver data to the device. In addition, each address contains information related to the location of the device. As such, should a network event of interest occur, for example, a malfunctioning device or an anomaly in network activity, the network protocol address(es) involved in the network event can be used to locate the device(s). For instance, a network administrator monitoring a network may discover that the device having the network protocol address x.x.x.2 is malfunctioning. The network port that the device is connected to is obtainable directly from the network protocol address and the physical location of the device in the building, office, or campus that the switch services can be trivially identified.

It should be appreciated that any network protocol address may be used as long as a predetermined portion of the address may be reserved for holding location information about the location of the device to which the address is assigned. In addition, the predetermined portion need not be assigned the port number of the network port to which it is attached, but may contain any information indicative of the location of the device.

For example, a server may administer addresses to nodes connected to a network having multiple switches. Accordingly, a first device connected to port 1 of a first switch on the network and a second device connected to port 1 of a second switch on the network will need to be assigned different addresses. The server may provide an offset equal to the number of ports on the first switch and assign this offset port number plus the port number to which the second device is connected. This number may then be applied to-the network protocol address assigned to the second device.

Accordingly, any offset may be determined in the above manner or otherwise to accommodate an arbitrary number of switches on a network, such that a node will be assigned an address uniquely identifying it on the network and that contains the ordinal position of the port in the plurality of ports on the network. The ordinal position of a port refers to information about the location of a port with respect to a plurality of other ports on the network. For instance, the server may maintain an order for the ports based on its knowledge of the switches on the network and rank them accordingly.

In addition, a server may maintain an internal association between network ports and a room or office number in the building which the port services. The server may then assign that number to the reserved portion of the network protocol address. Many variations and/or customizations to facilitate identifying the location of a device on a network suited to a particular network will occur to skilled practitioners and are considered to be within the scope of the present invention.

Figure 2:
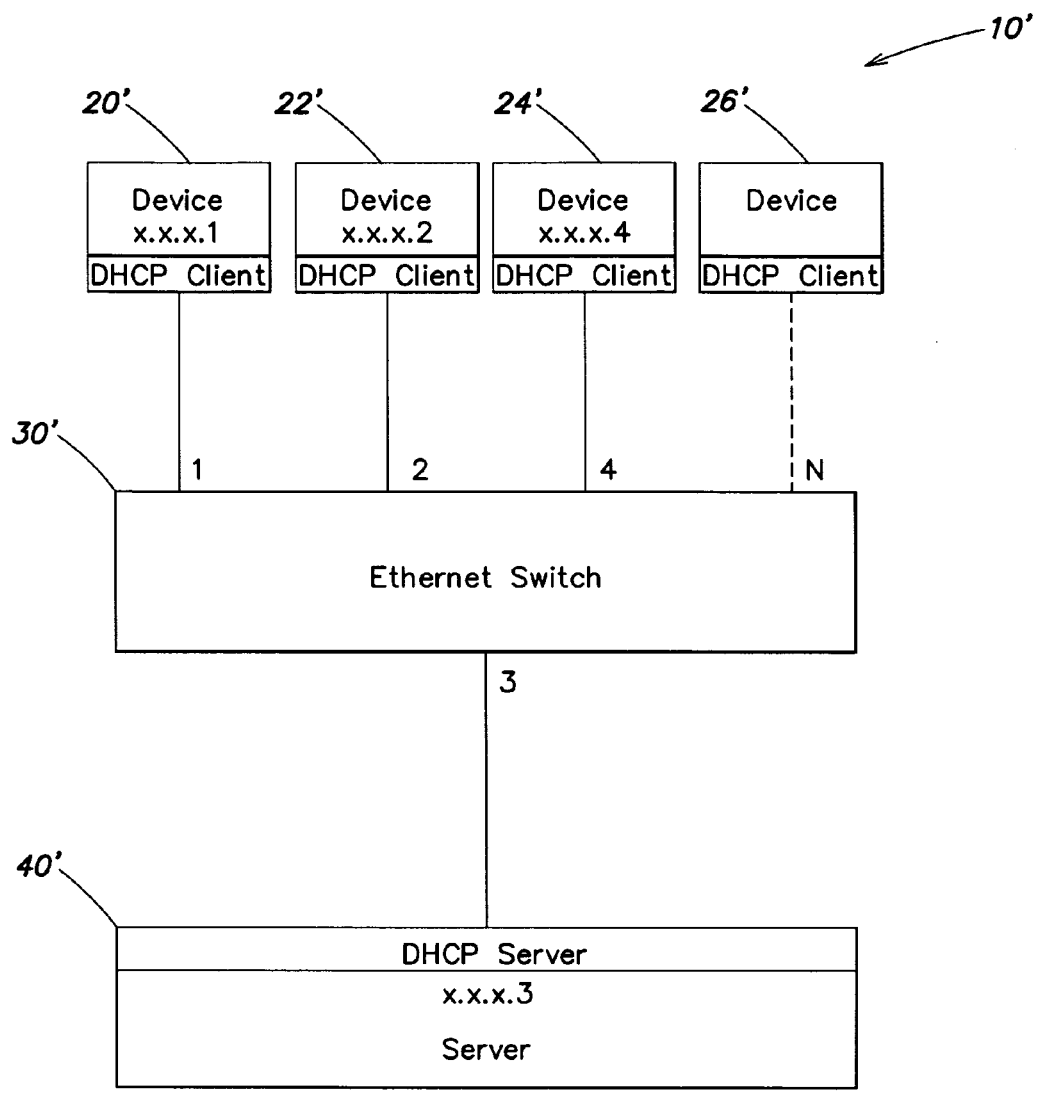
FIG. 2 illustrates a block diagram of a network having an Ethernet switch, a plurality of nodes configured as DHCP clients and a DHCP server employing a method of assigning network protocol addresses according to another embodiment of the present invention.
Figure 3:
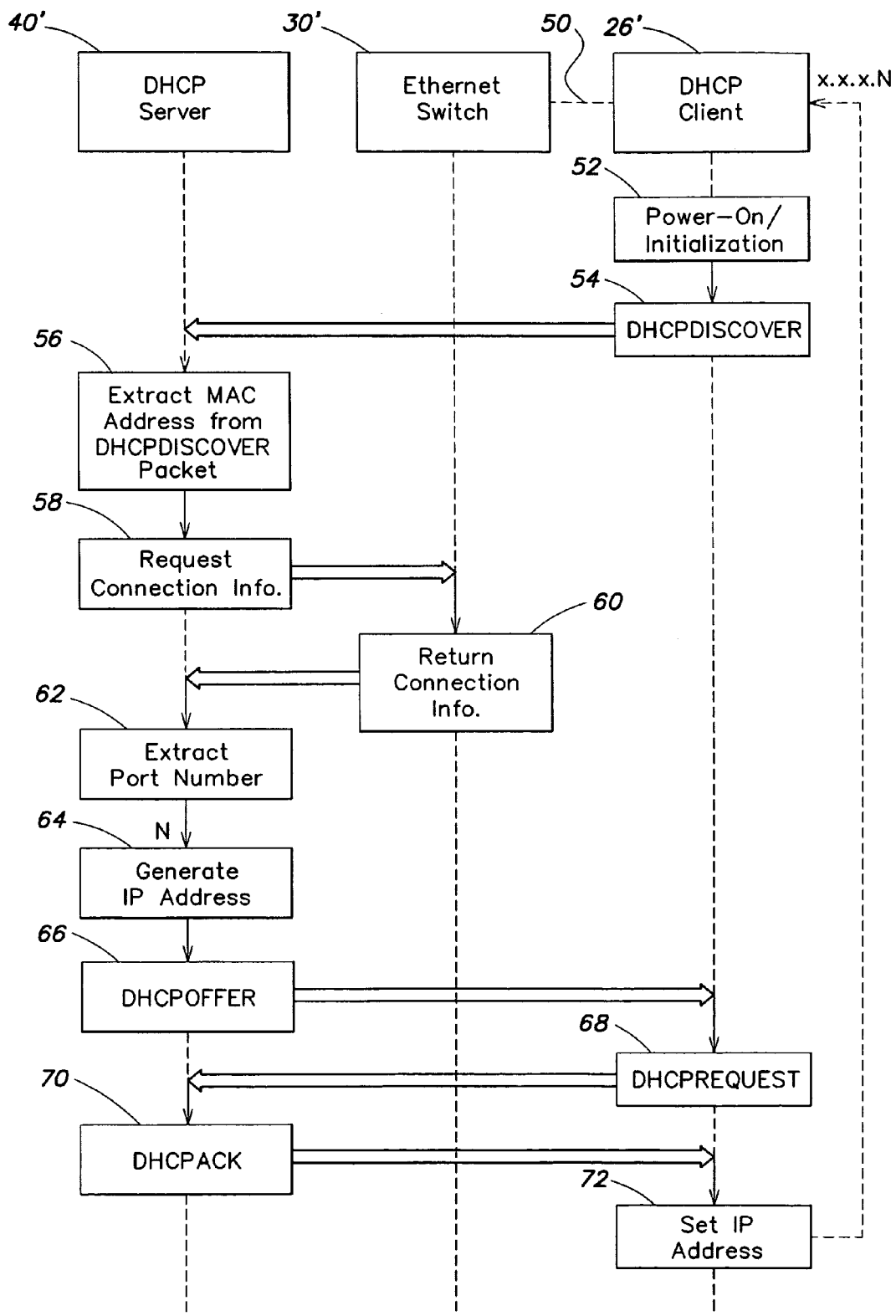
FIG. 3 illustrates a flow chart describing a method of assigning network protocol addresses to the plurality of nodes in the network of FIG. 2.

FIGS. 2 and 3 and the accompanying description provide details with respect to one method of assigning a network protocol address to a device according to the present invention. As illustrated in FIG. 2, network 10' is a Transmission Control Protocol/Internet Protocol (TCP/IP) network and switch 30' is an Ethernet switch. Network server 40' has been configured as a Dynamic Host Configuration Protocol (DHCP) server. Similarly, network devices 20', 22', 24', and 26' have been configured to operate as DHCP clients.

Network devices 20', 22' and 24' are connected at network ports 1, 2 and 4, respectively, and have been assigned network protocol addresses to uniquely identify each device on the network. Network device 26', in the example below, has just been connected to the network and has not yet been assigned a network protocol address. The following description with reference to FIG. 3 describes one method according to the present invention of assigning a network protocol address to device 26'.

Initially, device 26' is attached to the network as illustrated by the dotted line 50. In this example, device 26' is connected to the network at port N of switch 30' (i.e., any of the available ports on the switch). Then, in step 52, the device is powered on. Depending on the device, this step may include booting an operating system, polling the network connection to determine if the device has been connected to a network, and/or initialization procedures required by the device.

As discussed above, device 26' supports the DHCP protocol. In step 54, the device recognizes that it is connected to a network and begins a DHCP conversation over the network by broadcasting a DHCPDISCOVER packet, alerting available servers of its presence on the network and requesting assignment of an IP address.

In step 56, the server 40' receives the DHCPDISCOVER packet and extracts the physical layer address (e.g., the medium access control (MAC) address) that identifies the physical link or hardware specific information about device 26' from the DHCPDISCOVER packet and stores this information to later identify the device.

In step 58, upon saving the physical layer address of the device, the server 40' sends a Simple Network Management Protocol (SNMP) request to the Ethernet switch 30'. In particular, the server 40' issues a Get message to the Ethernet switch requesting information about the switch's current connection status. Often a switch will internally maintain a connection table to record information necessary to properly route packets received from the network. For example, a connection table may contain the medium access control (MAC) address of each of the devices on the switch, the port it is currently connected to, virtual connection identifiers, etc.

Certain protocols have been defined that permit nodes to request this information to be sent over the network. For example, a SNMP defined Get message may be issued requesting information from the appropriate Management Information Base (MIB) storing the requested information. For example, RFC 1493 defines a dot1dTdFdbTable object having a sequence of dot1dTpFdbEntry objects. Each dot1dTpFdbEntry object includes the MAC address, port number, and status information for each node on a switch. Details of these and other related objects can be found in RFC 1493, which is hereby incorporated by reference in its entirety. Those skilled in the art will be aware of alternative methods for obtaining connection information from a network. Such alternatives are considered to be within the scope of the invention.

The term "connection information" will be used herein to describe, in general, information obtained from the network about how nodes are connected to the various switches in a network and includes any of the various data structures, formats, standards, and protocols that may be implemented to store and to exchange this information. For example, any information that associates a device with port information of a port to which the device is connected is considered connection information.

In step 60, in response to the Get message issued by server 40', Ethernet switch 30' replies with the information requested by the DHCP server, by returning connection information in a dot1dTdFdbTable object.

In step 62, the DHCP server parses the dot1dTdFdbTable data structure received from Ethernet switch 30' to match the MAC address extracted from the DHCPDISCOVER packet broadcast by device 26' to one of the MAC addresses stored in the connection table. When the dot1dTpFdbEntry object having a MAC address matching the extracted MAC address, the associated port number is extracted from the entry.

It should be appreciated that connection information may be obtained in a variety of ways that will occur to those skilled in the art and is not limited to the example described in the foregoing.

In step 64, the DHCP server uses this port number to generate an IP address for device 26'. As discussed above, the port number may be used to generate further location information about the location of the device that may be suitable to a particular network implementation, or the port number may be appropriately offset in order to accommodate a plurality of switches on a network that the server administers. In the embodiment in FIG. 2, the port number is assigned to the final octet of the IP address.

In steps 66, 68, and 70 the DHCP server 40' and the device 26' negotiate a lease on the IP address. First, the DHCP server creates a DHCPOFFER packet and includes the IP address that it generated in step 64 from the port number obtained from the connection information and sends the packet to device 26'. The device responds to the DHCPOFFER packet with a DHCPREQUEST confirming the correctness of the IP address it received in the offer. The DHCP server confirms and acknowledges by sending a DHCPACK message to finalize the transaction.

In step 72, the device binds the assigned IP address. As a result, device 26' is assigned a network protocol address that allows the network to uniquely identify the device. In addition, the network protocol address assigned to device 26' includes location information that facilitates locating the device in the environment serviced by the network.

Figure 4:
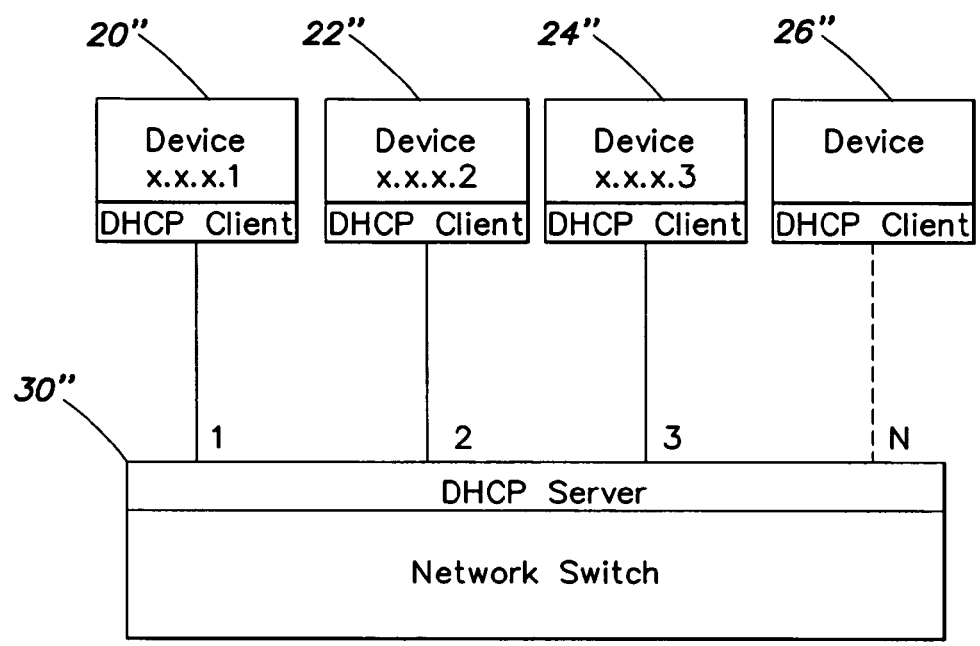
FIG. 4 illustrates a network having a switch and a plurality of nodes, the switch being configured as a DHCP server employing a method of assigning network protocol addresses to the plurality of nodes according to another embodiment of the present invention.
Figure 5:
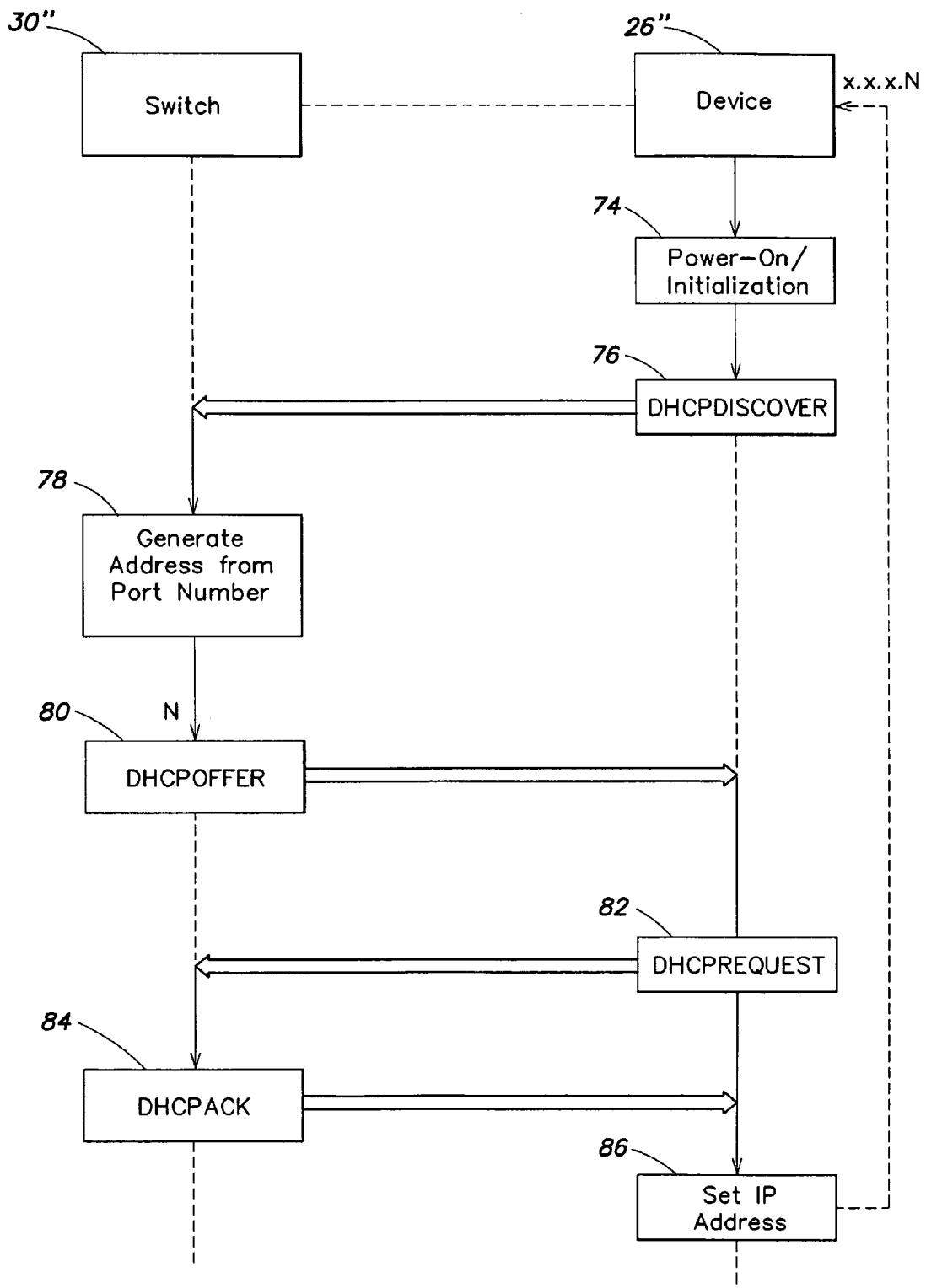
FIG. 5 illustrates a flow chart describing a method of assigning network protocol addresses to the plurality of nodes in the network of FIG. 4.

Another embodiment according to the present invention is illustrated in FIG. 4, in which switch 30" has been configured as a DHCP server and administers network protocol addresses to the nodes 20", 22" and 24" connected to port 1, 2, and 3, respectively. The procedure illustrated in FIG. 5 for assigning a network protocol address to recently connected device 26" is similar to that illustrated in FIG. 3 except that switch 30" functions as the DHCP server. In step 74, the device is powered on and begins its associated boot and initialization procedures.

In step 76, the device broadcasts a DHCPDISCOVER packet. The switch recognizes the packet, extracts the physical layer address from the message and parses its own connection table to determined at which port device 26" is connected.

In steps 78 and 80, the switch assigns the port number to a designated portion of a network protocol address and inserts the generated address into a DHCPOFFER packet and sends it to the device 26". In steps 82, 84, and 86 the negotiation and binding the address then continues as illustrated in FIG. 3 resulting in device 26" being assigned network protocol address x.x.x.N.

It should be appreciated that the invention is not limited to the particular network protocols discussed in the description of the various embodiments. Any of a variety of protocols that allow nodes to communicate with each other and/or obtain information from the network may be used without departing from the scope of the invention. Moreover, protocols or standards that may be developed and/or adopted in the future are also considered within the scope of the invention.

For example, as networks evolve, protocols may emerge that enable a node to directly obtain all the necessary information from the network in order to assign itself a network protocol address based on location information. A node may obtain information about a switch and/or a port at which the node is attached in order to generate and assign itself a network protocol address. The communication between a switch and a node or between a node and another node required to obtain location information may follow any protocol that is mutually agreed upon. As such, a device may contain all of the necessary expertise to generate and assign itself a network protocol address containing location information related to its location with respect to a network.

Moreover, a device may assign itself a network protocol address as a primary or secondary mode of operation. For instance, device 26" may be a DHCP client in addition to having the capability of obtaining information from the network and generating its own network protocol address based on location information. Accordingly, after the device has been powered on, a DHCPOFFER message may be broadcast in order to determine if there is a server available on the network. The device may then choose to allow the server to proxy for it and the process of assigning the device a network protocol address may proceed according to the steps described in connection with FIG. 3. Otherwise, the device may proceed with generating its own network protocol address based on location information it obtains from the network.

Appendix

In the following discussion, it will be assumed that the network is an IP network and negotiation is being carried out on an IP address.

When a node is attached to a network and powered-on, it broadcasts a DHCPDISCOVER packet to alert available servers of its presence and to request assignment of an IP address. Any DHCP server that sees the packet answers with a DHCPOFFER packet. Included in the DHCPOFFER packet is an IP address and other information related to lease of the IP address proposed in the offer. A client may receive multiple DHCPOFFER packets from various servers responding to the DHCPDISCOVER message. The client must choose the offer that it prefers and respond by broadcasting a DHCPREQUEST message to identify the chosen server and preferred lease offer.

If the offer is still valid, the server identified in the packet responds with a DHCPACK message to inform the client that the lease is finalized. If the offer is for some reason no longer valid, the server must respond with a DHCPNAK message. In response to the DHCPNACK, the client may broadcast another DHCPDISCOVER packet and the negotiation process would begin anew.

After the client receives a DHCPACK, ownership of the lease is presumed to belong to the client. That is to say, the client must explicitly send a DHCPDECLINE to the server in order to break the lease. The client is responsible for verifying the address. This is typically established by broadcasting an Address Resolution Protocol (ARP) request using the IP address offered in the lease. Should another node respond to the request, the address is assumed to be in use and the client should decline the offer with a DHCPDECLINE message and begin the process over again by broadcasting a DHCPDISCOVER message.

Otherwise, the client maintains the address throughout the term of the lease as negotiated in the DHCPOFFER packet. The client may renew the lease by sending a DHCPREQUEST message to the offering server before the term of the lease expires, or may terminate the least by sending a DHCPRELEASE message, thus making the address available to other nodes on the network. The foregoing sequence of events is merely an illustration of a typical negotiation.

Having described several embodiments of the invention in detail, various modifications and improvements will readily occur to those skilled in the art. Such modifications and improvements are intended to be within the scope of the invention. Accordingly, the foregoing description is by way of example only, and is not intended as limiting. The invention is limited only as defined by the following claims and the equivalents thereto.

What is claimed is:

1. A method of assigning a network protocol address to each of a plurality of nodes connected via a network, each of the plurality of nodes located in separate locations remote from each other, the method comprising acts of:
   obtaining port information from the network about a port on at least one switch having a plurality of ports to which the plurality of nodes are respectively connected, the at least one switch located remote from the plurality of nodes; and
   embedding the port information in at least a portion of the network protocol address to be assigned to one of the plurality of nodes.

2. The method of claim 1, further comprising an act of determining, from the port information, an ordinal position of the port in the plurality of ports, and wherein the act of embedding the port information includes an act of embedding the ordinal position of the port to a predetermined portion of the network protocol address.

3. The method of claim 1, wherein the network protocol address is an internet protocol (IP) address to be assigned to the node, and wherein the port information is embedded in at least one octet of the IP address.

4. The method of claim 1, wherein the separate locations correspond to separate rooms in a building.

5. The method of claim 4, further comprising an act of associating each of the plurality of ports with the location of a respective one of the plurality of nodes attached to the port.

6. The method of claim 5, further comprising generating a diagnostic listing the network address of a faulty node, and locating, by a human operator, the faulty node using the association between the port and the location of the respective node.

7. A computer readable medium encoded with a program for execution on at least one processor, the program, when executed on the at least one processor, performing a method of assigning a network protocol address to each of a plurality of nodes connected via a network, each of the plurality of nodes located in separate locations remote from each other, the method comprising acts of:
   obtaining port information from the network about a port on at least one switch having a plurality of ports to which the plurality of nodes are respectively connected, the at least one switch located remote from the plurality of nodes; and
   embedding the port information in at least a portion of the network protocol address to be assigned to one of the plurality of nodes.

8. The computer readable medium of claim 7, further comprising an act of determining, from the port information, an ordinal position of the port in the plurality of ports, and wherein the act of embedding the port information includes an act of embedding the ordinal position of the port to a predetermined portion of the network protocol address.

9. The computer readable medium of claim 7, wherein the network protocol address is an internet protocol (IP) address to be assigned to the node, and wherein the port information is embedded in at least one octet of the IP address.

10. The computer readable medium of claim 7 in combination with the plurality of nodes, each of the plurality of nodes comprising a processor and a memory,
    wherein the computer readable medium includes the memory and the program is stored in the memory and upon connection of one of the plurality of nodes to the network, the processor executes the program stored in the memory.

11. The combination of claim 10, wherein the act of obtaining port information includes requesting from the at least one switch a port number of the port to which the node is connected.

12. The combination of claim 11, wherein the network protocol address is an internet protocol (IP) address for the node, and wherein the act of embedding the port information includes an act of embedding the port number in at least one octet of the IP address.

13. The computer readable medium of claim 7 in combination with a network server connected to the network, the server comprising a processor and a memory,
    wherein the computer readable medium includes the memory and the program is stored in the memory and the network server is configured to execute the program after a node is connected to the network.

14. The combination of claim 13, wherein the server is configured as a Dynamic Host Configuration Protocol (DHCP) server and the program is executed upon receiving a DHCPDISCOVER packet from the node.

15. The combination of claim 13, wherein the server obtains the port information by requesting connection information from the at least one switch.

16. The combination of claim 13, wherein the network protocol address is an internet protocol (IP) address for the node, and wherein the act of embedding the port information includes an act of embedding the port information in at least one octet of the IP address.

17. The computer readable medium of claim 7, wherein the separate locations correspond to separate rooms in a building.

18. The computer readable medium of claim 17, further comprising an act of associating each of the plurality of ports with the location of a respective one of the plurality of nodes attached to the port.

19. The computer readable medium of claim 18, further comprising generating a diagnostic listing the network address of a faulty node, and locating, by a human operator, the faulty node using the association between the port and the location of the respective node.

20. A network comprising:
at least one switch having a plurality of ports;
a plurality of nodes connected to respective ones of the plurality of ports of the at least one switch, each of the plurality of nodes located in separate locations remote from each other and remote from the at least one switch; and
address assignment means adapted to obtain port information about the plurality of ports and configured to embed the port information in at least a portion of network protocol addresses assigned to the plurality of nodes, the port information assigned to each of the plurality of nodes being indicative of the port at which the respective node is connected.

21. The network of claim 20, wherein the server determines, from the port information, an ordinal position of the plurality of ports to which the plurality of nodes are attached and embeds the ordinal position in a predetermined portion of the network protocol addresses.

22. The network of claim 20, wherein the server assigns internet protocol (IP) addresses such that at least one octet of an IP addresses assigned to the plurality of nodes is based on the port information.

23. The network of claim 20, wherein the assignment means is at least one of the plurality of nodes, and wherein the at least one of the plurality of nodes is configured to obtain the port information from the network and to embed the port information in at least the portion of the network protocol addresses.

24. The network of claim 23, wherein the port information includes the ordinal position of the port in the plurality of ports to which the respective plurality of nodes are connected.

25. The network of claim 23, wherein the network protocol addresses are an internet protocol addresses, and wherein the at least one of the plurality of nodes embeds the port information in at least one octet of the internet protocol addresses.

26. The network of claim 20, wherein the separate locations correspond to separate rooms in a building.

27. The network of claim 26, wherein each of the plurality of ports are associated with a respective one of the separate locations from where respective ones of the plurality of nodes are connected.

28. The method of claim 27, further comprising at least one network component for generating a diagnostic listing the network address of a faulty node from which a human operator can locate the faulty node using the association between the port and the location of the respective node.

* * * * *